Figure 1A:
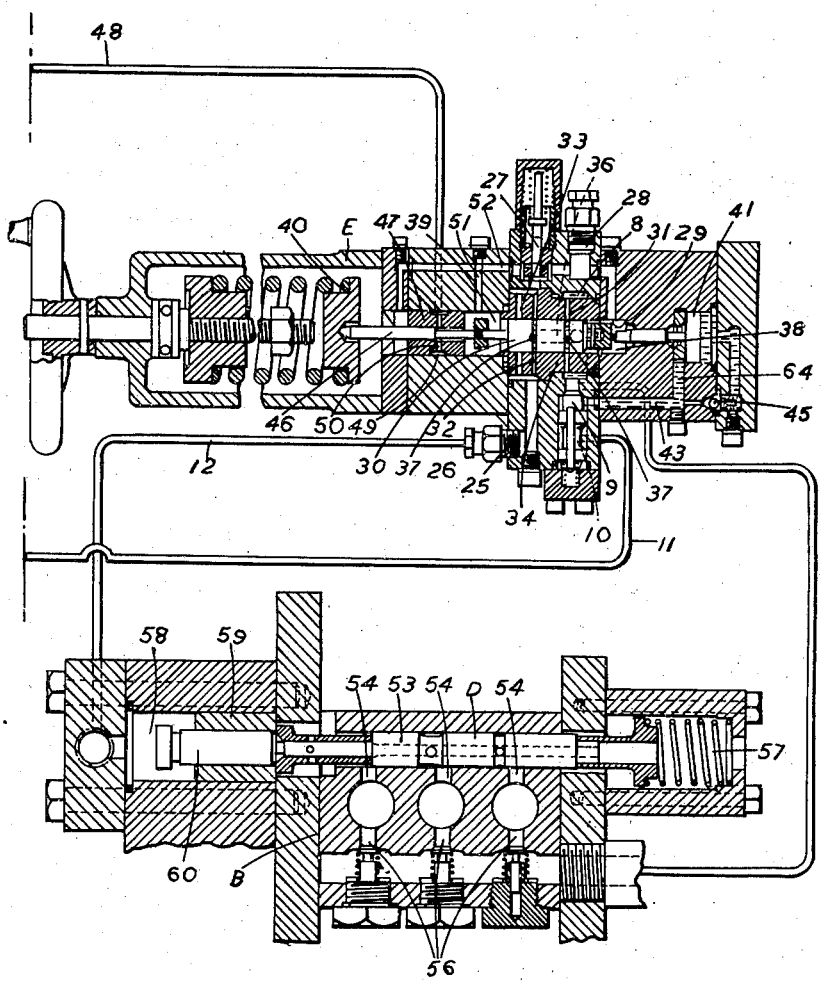

July 5, 1949.   J. M. TOWLER ET AL   2,475,414
HYDRAULIC SYSTEM FOR UNLOADING LARGE CAPACITY PUMPS
Filed June 29, 1946   2 Sheets-Sheet 1

July 5, 1949. J. M. TOWLER ET AL 2,475,414
HYDRAULIC SYSTEM FOR UNLOADING LARGE CAPACITY PUMPS
Filed June 29, 1946 2 Sheets-Sheet 2

Patented July 5, 1949

2,475,414

UNITED STATES PATENT OFFICE 2,475,414

HYDRAULIC SYSTEM FOR UNLOADING LARGE CAPACITY PUMPS

John Maurice Towler, Harrogate, and Frank Hathorn Towler, Otley, England

Application June 29, 1946, Serial No. 680,498
In Great Britain May 25, 1945

Section 7, Public Law 690, August 8, 1946
Patent expires May 25, 1965

1 Claim. (Cl. 103—11)

This invention relates to an hydraulic system for controlling the supply of pressure liquid to an hydraulic press. In some classes of press work it is necessary to move the press ram rapidly whilst under full pressure and where the ram is of large diameter this involves the supply of a large volume of liquid, and, in consequence, the use of a large capacity pump. At the end of the working stroke make-up liquid only is required to maintain the pressure in the hydraulic main so means must be provided to reduce the supply of pumped liquid. One way of doing this is to cause the excess liquid supplied by the large pump to escape past a relief valve. This is however an objectionable method as it results in the heating up of the oil and considerable noise.

Another method which we employ in connection with our smaller capacity pumps is to unload the pump rams by means of an unloading valve which operates automatically under the influence of the pressure in the pump main. This method is however quite unsuitable in the case of the large capacity pump as it means that the same is caused to cut in and out repeatedly, giving rise to violent shocks and noise.

The object of the present invention is to provide a new or improved system by means of which a large capacity pump may be fully unloaded and loaded without undue shock or noise and by means whereby the maximum pressure generated by the two pumps is controlled by a single adjustment.

Broadly the present invention consists of an hydraulic system for controlling the supply of pressure liquid to an hydraulic press comprising a large capacity pump for supplying the main liquid for operating the press ram, a small capacity pump for maintaining substantially constant the pressure in the delivery main and an automatically operating master control valve having two valve portions one of said portions being adapted to control the delivery of the large capacity pump so that said delivery is diverted wholly to exhaust at a predetermined pressure in the delivery main and the other valve portion being adapted to control the delivery of the small capacity pump whereby said small capacity pump is caused to maintain pressure on the press ram after the large capacity pump has been cut out, said valve portions both being subject to a common and adjustable load so that the maximum pressure generated by the two pumps is controlled by a single adjustment.

In accordance with the present invention we employ a small capacity pump in conjunction with a large capacity pump. This small capacity pump is used to maintain the pressure on the press ram after the large capacity pump has been cut out and the delivery of this small capacity pump is preferably controlled automatically by means of an unloading valve which operates to unload one or more of the pump chambers according to the demand on the pump in maintaining substantially constant the pressure in the delivery main but the same may be caused to blow off through a relief valve.

The large capacity pump is unloaded by diverting the whole of its delivery to exhaust, and this is effected under the control of an automatically operating valve which functions to open the pump delivery to exhaust when a predetermined maximum pressure in the main is exceeded.

The operation of this exhaust control valve may be controlled by a combined sustained pressure and unloading valve. The sustained pressure side of this valve operates automatically under the pressure in the main to pass liquid at a lower pressure to the unloading valve of the small pump to unload one or more of its rams when the maximum pressure in the main is reached, whilst the unloading valve part of this combined valve operates to connect the exhaust control valve of the large capacity pump to exhaust to cause the same to function and divert the delivery of said large capacity pump to exhaust.

As previously stated the small pump need not be of the sustained pressure type but may blow off through a relief valve. This valve and the relief valve for the large pump are mounted in tandem and so that the latter valve operates first.

In the embodiment of the invention hereafter to be described in connection with the accompanying drawing the delivery of the large capacity pump is controlled by an automatically operating amplifier unloading valve and the delivery of the small capacity pump by means of an automatically operating unloading valve and the operations of both valves are controlled by a master control and unloading valve.

There are, however, other ways in which the invention may be carried out. For example, instead of the amplifier unloading valve we may use a non-return valve with the space below the said valve connected respectively to the delivery of the large capacity pump and one of the valve portions of the master control valve and the space above the non-return valve connected respectively to the hydraulic machine and to the inlet of the master control valve.

In another embodiment using the above non-return valve, the unloading valve associated with the small capacity pump is replaced by means of a relief valve constituted by one of the valve portions of the master control valve.

In a still further embodiment the delivery of the small capacity pump is controlled by the aforesaid relief valve whilst the delivery of the large capacity pump is controlled by an amplifier unloading valve.

Figure 1B:
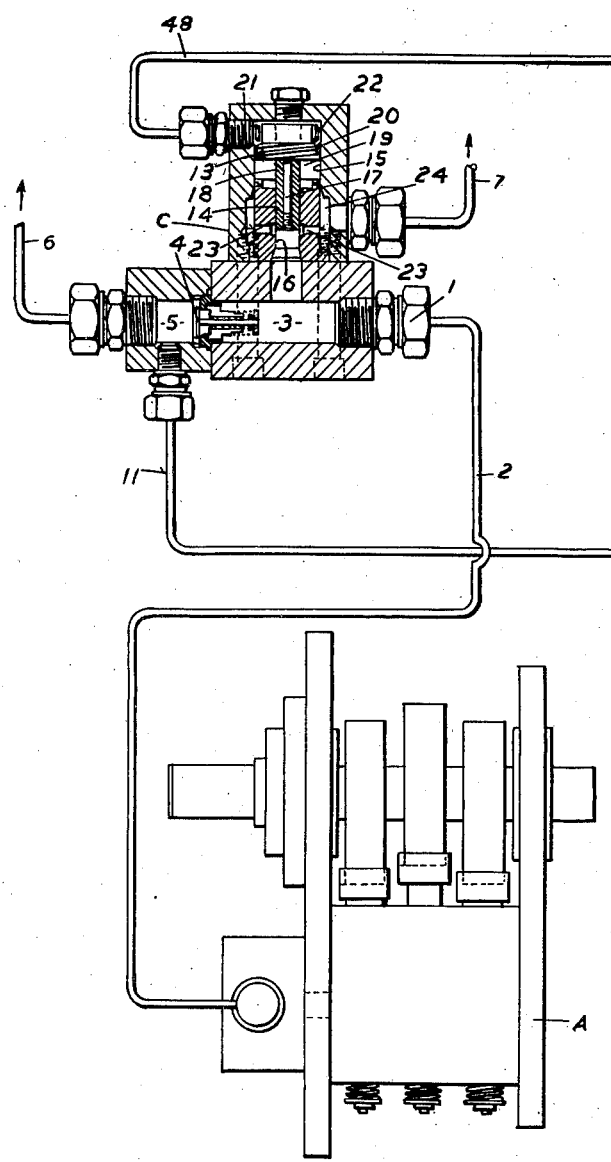

Claims directed to the generic invention disclosed herein and to the three additional species of the same invention generally referred to in the three preceding paragraphs hereof, are contained in our co-pending application Serial No. 84,916 filed April 1, 1949, as a continuation-in-part of the present application, the single claim of the present application being restricted to that form or species of the invention illustrated in Figs. 1A and 1B of the accompanying drawings.

To enable the invention to be understood and carried into effect, the first described embodiment of the improved system will now be described by aid of the accompanying diagram in which the pieces of apparatus forming the combination are shown coupled up in the manner of the invention and in which:

Fig. 1A illustrates in sectional elevation a control valve E and a small capacity pump B of the sustained pressure type, and Fig. 1B illustrates a large capacity pump A and an amplifier unloading valve C, the apparatus of the respective Figs. 1A and 1B being connected to one another through the conduits 11 and 48.

The system illustrated in the diagram comprises a large capacity pump A, a small capacity pump B, an amplifier unloading valve C for controlling the unloading of the pump A, an unloading valve D associated with the pump B and a master control and unloading valve E for controlling the supply of pressure liquid to the unloading valve D and for controlling the escape of liquid from the amplifier section of the valve C.

As will be seen from the drawing the delivery of the large capacity pump A is connected to the inlet 1 of the amplifier unloading valve C by means of a pipe 2 and the liquid so delivered passes along a passage 3, past a non-return valve 4, into a space 5 and so out to the hydraulic press, not shown, by way of pipe 6.

Whilst the hydraulic press is capable of using the pressure liquid delivered by the large capacity pump A said liquid will continue to flow through the valve C by the path above set forth but as soon as the press has completed its pressure stroke the resulting rise in the pressure of the liquid within the passage 3 of the valve C causes said valve to operate automatically to open an alternative path for the liquid from the pump terminating in the pipe 7 which leads to exhaust. The liquid pumped by the small capacity pump B is delivered into an annulus 8 in the master control valve E from whence it passes by way of non-return valve 9, outlet 10, and pipe connection 11 to the space 5 in valve C, and so to the hydraulic press by way of pipe 6.

The liquid so delivered by the pump B to the master control valve is utilised to effect the operation of said valve to deliver liquid at a lower pressure for the operation of the unloading valve D by way of pipe 12. The operation of the valve E is also utilised to cause automatic operation of the amplifier section of the valve C in a manner hereafter to be described. It is to be understood however that this amplifier section consisting of a large area piston is only required in those cases where the capacity of pump A is too large to be handled by a simple unloading valve.

The amplifier unloading valve C illustrated in the diagram is of the packingless piston type and comprises a piston 13 and plunger 14 in one piece which is a close sliding fit in a valve body having two corresponding concentric bores 15 and 16 respectively. For facility of description we will assume that this valve is disposed with its axis vertical, with the piston at the top and the plunger projecting downwards into the smaller bore of the valve body, which bore is open at the bottom and communicates with the fluid pressure in space 3. The plunger is provided with a central bore 17 extending upwards to a point just below the piston where a number of radial holes 18 provide communication between the central bore and the space 19 below the piston. The circumference of the piston is provided with a helical groove 20 which serves as a restricted passage between the lower and upper areas of the piston. The valve bore in which the piston is a close sliding fit is closed at the top and provided with an outlet 21 which is opened and closed by a valve in the master control valve E. A light spring 22 is provided within the piston bore to resist the upward movement of the piston. The lower part of the valve body is provided with a number of radial holes 23 communicating between the plunger bore and an annulus 24 which in turn communicates with the exhaust outlet 7 in the side of the valve body. When the piston is in the bottom position the radial holes 23 are covered by the lower end of the valve plunger and the valve is closed. When the piston is moved upwards these radial holes are uncovered by the valve plunger thereby opening the delivery of pump A to exhaust. It will be understood from the above that the construction of the valve is such that the fluid pressure has at all times free access to the under side of both the plunger and the piston and restricted access to the upper side of the piston through the helical groove in the circumference of the piston. The operation of the valve is therefore as follows: When the fluid pressure reaches a predetermined figure the outlet 21 is opened to exhaust. Pressure fluid then flows up through the valve plunger into the space 19 under the piston and thence through the helical groove around the circumference of the piston into the space above the piston and out through the said outlet and owing to restricted passage through the helical groove the pressure below the piston must become greater than that above the piston, so that as the flow increases through the outlet 21 the pressure difference across the piston increases sufficiently to move the piston upwards in opposition to the resistance of the light spring 22 and as the piston rises the lower end of the valve plunger uncovers the radial holes 23 in the plunger bore and the valve is open to exhaust. Then if the pressure falls sufficiently for the master control valve to close the outlet 21 against the escape of liquid the pressure builds up on top of the piston so as to restore hydraulic balance when the piston is moved downwards by the light spring 22 and the lower end of the valve plunger again covers the radial holes 23 and the valve is closed to exhaust.

The example of combined master control and unloading valve illustrated in the diagram incorporates in its body the annular chamber 8, an outlet 10 said outlet receiving liquid from the chamber 8 under the control of the non-return valve 9, an outlet 25 for connection to the unloading valve D of pump B by the pipe 12 said outlet receiving liquid from a further annular chamber 26 a spring pressed relief valve 27 open to the pressure of the liquid in said annular chamber 26 and an exhaust outlet 28.

Within the valve body, so as to be surrounded concentrically by the annular chambers 8 and 26, is a bore 29 for the reception in a close sliding fit of a valve plunger or piston 30. The annular chambers are in communication with the interior of the bore 29 by means of two sets of radial passages, one set 31 connecting the bore with the lower annular chamber 8 and the other set 32 connecting the bore with the upper annular chamber 26. A further set of radial passages 33 is provided to connect the chamber 26 with the bore at a point above the set of passages 32 to connect said chamber 26 with the exhaust outlet 28 when the valve plunger is in its lowered position.

Cut in the exterior surface of the valve plunger so to encircle the same are annular grooves 34 and 35. These grooves are spaced longitudinally a distance equivalent to the distance between the centres of the sets of radial passages 31 and 32 with which they are adapted to register when the valve plunger is in the raised or open position shown in the drawing. The grooves 34 and 35 communicate with a longitudinal passage 36 within the interior of the valve plunger by means of radial holes 37. By this means a passage for liquid is provided between the annular chambers 8 and 26 when the valve plunger is in the raised position and said chambers are isolated from each other when the valve plunger is in the lowered position, and said plunger is always in hydraulic balance laterally. At opposite ends of the valve plunger are spaces 38 and 39 which are always in free communication with the exhaust outlet 28. The plunger is therefore always in hydraulic balance longitudinally.

In the drawing the valve plunger is shown in the raised position and passing liquid at a predetermined pressure from pump B to the unloading valve D. The movement of the plunger to the raised position is effected against a spring 40 by pressure liquid acting upon the lower or full pressure side of a piston 41, the stem of which enters the space 38 and abuts against the lower end of of the valve plunger.

The pressure liquid which acts against the underside of the piston 41 is derived from the annular chamber 8 and for this purpose this chamber is connected with both ends of the cylinder in which the piston works by passages 43 and 44. In the passage 43 is positioned a non-return valve 45 which serves to pass liquid freely to the underside of the piston but which closes automatically under the influence of its spring, when the pressure falls, to close the passage and prevent the liquid from escaping from the lower end of the aforesaid cylinder. The liquid thus trapped is permitted to escape at a relatively slow rate by leakage past the piston to the upper end of the cylinder to join the liquid in the chamber 8 for which purpose the piston 41 is given sufficient clearance in its cylinder to permit the said leakage to take place at the desired rate.

By means of the arrangement just described the pressure liquid is permitted to act against an effective area of the piston 41 equal to the area of the stem 42 and when this pressure is sufficient to overcome the resistance of the spring 40 the valve plunger is forced upwards to the position illustrated in the drawing. By thus permitting the pressure liquid to have free access to the underside of the piston the valve plunger is rendered fully sensitive to and is immediately actuated by a sudden increase in the pressure of said liquid and by restricting the escape of the liquid from the underside of the piston the return movement of the valve plunger by the spring is damped to prevent hunting.

As will be seen from reference to the drawing the spring loadings on both the valve plunger and the relief valve 27 are independently adjustable so as thereby to vary the pressure of the liquid passing to the cylinder of the unloading valve D and of that passing to the press cylinder independently.

So that the valve E may also function as an unloading valve for controlling the escape of pressure liquid from the outer side of the piston 13 in the amplifier section of the valve C the plunger 30 of the master control valve E is extended to coact with a plunger 46. This plunger is a fluid-tight fit in a bush 47 and, at its lower end, is of reduced section so that in the open position shown in the diagram said reduced section provides a passage for the escape to exhaust of pressure liquid from the outer side of the piston 13 in valve C by way of pipe 48, annulus 49 and radial holes 50. The exhausting liquid first enters space 39 and then passes out to the exhaust outlet 28 by way of passages 51 and 52.

The unloading valve D comprises an automatically operating plunger 53 which is moved longitudinally and relative to a discharge outlet 54 in the wall of each pump bore 55, said outlets 54 being additional to the usual valve controlled pump discharge outlets 56 and said longitudinal movement being effected against a spring 57 constituting a predetermined load. For thus moving the plunger 53 the pressure liquid from valve E is admitted to a space 58 and it there acts against a piston 59 and a ram 60, the piston being of substantially larger area than the ram on which it is mounted for independent relative movement. With this arrangement the first part of the plunger's stroke is effected by the pressure liquid acting against the combined areas of the piston 59 and the ram 60 and this movement is utilised, in the illustrated example, to unload two of the pump chambers. The unloading of the last or third pump chamber in the series is effected by the ram alone and this requires a substantial rise to occur in the pressure of the liquid before it can take place owing to the much smaller area presented to the pressure liquid by the ram than was presented by the combined areas of the piston and the ram which was available for imparting the first part of the unloading stroke. This enables the last pump bore, or pump where separate pumps are under control, to be cut in and out rapidly to supply make-up liquid to the hydraulic press to counteract normal leakage when the pump A is cut out, with the other pump chambers or pumps remaining unloaded.

It will be seen that with the arrangement just described both pumps are controlled or unloaded by two valves operating in tandem and subject to one load adjustment whereby the valves do not have to be adjusted independently. If desired the two valves may be combined in one valve body.

We claim:

An hydraulic system for controlling the supply of pressure liquid to an hydraulic press comprising a large capacity pump for supplying main liquid through a delivery main for operating the press ram, an automatically operating amplifier unloading valve for wholly unloading the large capacity pump at a predetermined pressure, a small capacity pump for supplying make-up liquid for maintaining substantially constant the pressure in the delivery main on the press ram when the large capacity pump has been cut out, an unloading valve associated with said small capacity pump, and a combined automatically operating master control and unloading valve, said master valve having two valve portions, one of said portions being adapted to control the release of liquid from the amplifier section of the amplifier unloading valve of the large capacity pump, to control the delivery of the large capacity pump so that said delivery is diverted wholly to exhaust at a predetermined pressure in the delivery main, and the other valve portion being adapted to control the supply of pressure liquid for the operation of the last-mentioned unloading valve of the small capacity pump to control the delivery of the small capacity pump, said valve portions both being subject to a common and adjustable load so that the maximum pressure generated by the two pumps is controlled by a single adjustment.

JOHN MAURICE TOWLER.
FRANK HATHORN TOWLER.

REFERENCES CITED

The following references are of record in the file of this patent:

UNITED STATES PATENTS

| Number | Name | Date |
|---|---|---|
| 1,873,483 | Pfauser | Aug. 23, 1932 |
| 2,195,478 | Blozek et al. | Apr. 2, 1940 |
| 2,250,551 | Pfauser | July 29, 1941 |